United States Patent [19]
Murasaki

[11] Patent Number: 5,643,651
[45] Date of Patent: Jul. 1, 1997

[54] MOLDED SURFACE FASTENER AND METHOD FOR MANUFACTURING THE SAME

[75] Inventor: Ryuichi Murasaki, Toyama-ken, Japan

[73] Assignee: YKK Corporation, Tokyo, Japan

[21] Appl. No.: 666,602

[22] Filed: Jun. 18, 1996

[30] Foreign Application Priority Data

Jun. 20, 1995 [JP] Japan .................. 7-153560

[51] Int. Cl.⁶ .................................................. B32B 3/06
[52] U.S. Cl. ..................... 428/100; 428/138; 428/195; 428/196; 24/442
[58] Field of Search ........................... 428/100, 138, 428/195, 196, 247, 255; 24/442

[56] References Cited

U.S. PATENT DOCUMENTS

| 3,267,191 | 8/1966 | Williams et al. ............ 264/166 |
| 5,520,983 | 5/1996 | Yamamoto et al. ............ 428/100 |

FOREIGN PATENT DOCUMENTS

| 0661008A2 | 7/1995 | European Pat. Off. . |
| 5211909 | 8/1993 | Japan . |
| 7-79812 | 3/1995 | Japan . |
| 2160586 | 12/1985 | United Kingdom . |

*Primary Examiner*—Alexander Thomas
*Attorney, Agent, or Firm*—Hill, Steadman & Simpson

[57] ABSTRACT

A plurality of molded surface fasteners, each having a substrate sheet and a multiplicity of hook elements, are connected to one another via a sheet-like connector embedded in the individual substrate sheets over their entire area. In production, a die wheel having a plurality of male-engaging-element-forming cavity groups, which are formed by dividing a plurality of axially arranged rows of cavities with a number of circumferential predetermined-width cavity-free areas disposed therebetween, said cavity groups being for molding the plurality of male engaging elements circumferentially on said die wheel is rotated in one direction, a predetermined width of molten resin is continuously injected from an injection die toward said male-engaging-element-forming cavity groups of said die wheel, a sheet-like connector having adequate open spaces through which said molten resin is to be passed is continuously introduced circumferentially of said die wheel during said injecting, and the circumferential surface of said die wheel are positively cooled.

5 Claims, 7 Drawing Sheets

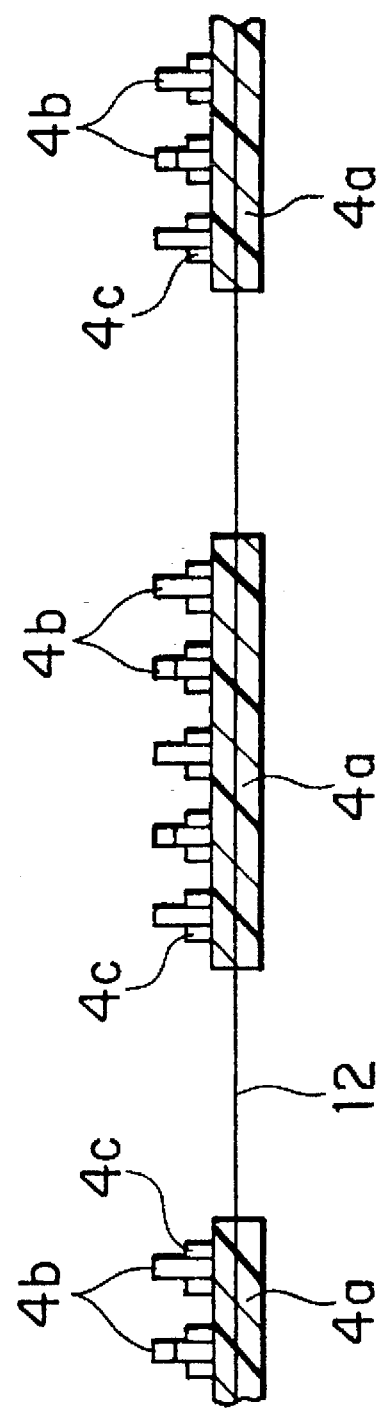

MOLDED SURFACE FASTENER AND METHOD FOR MANUFACTURING THE SAME

BACKGROUND OF THE INVENTION

1. Field of the Invention

This invention relates to a molded surface fastener having a multiplicity of male engaging elements integrally molded on one surface of a substrate sheet, continuously molded by injection or extrusion using thermoplastic resin, and more particularly to a molded surface fastener which can hardly be torn in a substrate sheet and is hence very flexible over its entire area.

2. Description of the Related Art

There is currently known a synthetic resin surface fastener in which one surface of a substrate sheet is divided into sections with a plurality of mushroom-shape engaging elements standing from each section and the substrate sheet has a number of grooves or thin portions along borders of the individual sections. This conventional art is exemplified by Japanese Patent Laid-Open Publication No. Hei 7-79812, according to which because of the grooves, the surface fastener can easily be torn along a desired groove to provide a desired width surface fastener and is very flexible along the individual grooves so that it can be attached to fit to various contours of articles.

According to Japanese Patent Laid-Open Publication No. Hei 7-79812, since the substrate sheet simply has the plurality of grooves, when a plurality of subdivided surface fasteners are used as an engaging member as being connected to one another via the individual grooves, the substrate sheet tends to be torn along the individual grooves and is therefore inadequately durable over repeated use.

SUMMARY OF THE INVENTION

A first object of this invention is to provide a molded surface fastener in which a multiplicity of male engaging elements are integrally molded on a substrate sheet, which is divided into a desired number of sections via part of a hard-to-tear sheet-like connector, by injection or extrusion molding using a simple mechanism without reconstructing the conventional molding machine.

A second object of the invention is to provide a molded surface fastener which is adequately flexible and in which a substrate sheet divided into sections has an adequate degree of toughness while connecting areas between the substrate-sheet sections have a predetermined degree of toughness.

Additional objects of the invention will be manifest from the description of preferred embodiments described below.

According to a basic structure of the surface fastener of the invention, molten resin is passed through a coarse sheet-like connector having spaces enough for the molten resin to pass, so that the substrate sheet divided into a desired number and the male engaging element are molded simultaneously, and at the same time, the connector is embedded in the substrate sheet with the connector connecting the divided substrate sheets.

According to a first aspect of the invention, there is provided a molded surface fastener of synthetic resin, comprising a substrate sheet and a multiplicity of male engaging elements integrally molded with the substrate sheet and standing in rows on one surface of the substrate sheet. The substrate sheet is divided into sections connected to one another via a connector which is smaller in thickness than the substrate sheet and has open spaces through which molten resin is to be passed during the molding of the substrate sheet. The connector is integrally joined with the substrate sheet simultaneously with the molding of the substrate sheet and the male engaging elements.

Preferably, the substrate sheet is divided into two or more sections spaced a predetermined gap from one another transversely of the surface fastener via the connector. Further, the connector is spread transversely of the surface fastener and is composed of a plurality of fiber yarns or metal wires parallel spaced at predetermined distances longitudinally of the surface fastener. Alternatively, the connector may be a coarse woven fabric, knit fabric or metal net having adequate open spaces over its entire area through which molten resin is to be passed during the molding of the substrate sheet. And in another alternative form, the connector may be non-woven cloth, paper or synthetic resin film having adequate open spaces over its entire area through which molten resin is to be passed during the molding of the substrate sheet.

The sheet-like connector to be used in this invention must have over its entire area adequate open spaces through which molten resin can easily be passed. Generally, the molten resin pressure during injection is 50–150 kg/cm$^2$, acting on the sheet-like connector, The size of the open spaces of the sheet-like connector is preferably larger than 0.25 mm$^2$ in at least one space area. A desirable size of the open spaces can be obtained by varying the weave or knit density and its structure or the mesh in metal net, varying the pitch of longitudinal arrangement of yarns or metal wires, or varying the area of open spaces in non-woven cloth, paper or synthetic resin film. The thickness of the sheet-like connector sould be determined basically depending on the thickness of the substrate sheet of the surface fastener to be molded and the use of the surface fastener. In order to facilitate molding, it is preferably 10–30% of the substrate sheet thickness. Therefore, the size of fiber yarns or metal wires constituting the sheet-like connector also may be determined as desired depending on the required thickness of the sheet-like connector.

According to a second aspect of the invention, there is provided a method of manufacturing a synthetic resin surface fastener having a substrate sheet and a multiplicity of male engaging elements integrally molded on the substrate sheet, comprising the steps of: rotating in one direction a die wheel having a plurality of male-engaging-element-forming cavity groups, which are formed by dividing a plurality of axially arranged rows of cavities with a number of circumferential predetermined-width cavity-free areas disposed therebetween, the cavity groups being for molding the plurality of male engaging elements circumferentially on the die wheel; continuously injecting a predetermined width of molten resin from an injection die toward the male-engaging-element-forming cavity groups of the die wheel; continuously introducing, during the injecting, circumferentially of the die wheel a sheet-like connector having adequate open spaces through which the molten resin is to be passed; integrally molding the substrate sheet with the sheet-like connector on the circumferential surface of the die wheel and, at the same time, molding the male engaging elements on the circumferential surface of the die wheel as the male-engaging-element-forming cavities are filled with part of the molten resin by injecting the molten resin at a predetermined resin pressure onto the circumferential surface of the die wheel, at a portion where the molten resin is introduced onto the die wheel; positively cooling the circumferential surface of the die wheel; and continuously taking up the molded and cooled surface fastener from the circumferential surface of the die wheel.

According to a third aspect of the invention, there is provided a method of manufacturing a synthetic resin surface fastener having a substrate sheet and a multiplicity of male engaging elements integrally molded on the substrate sheet, comprising the steps of: rotating a die wheel, which has a plurality of male-engaging-element-forming cavity groups which are formed by dividing a plurality of axially arranged rows of cavities with a number of circumferential predetermined-width cavity-free areas disposed therebetween, the cavity groups being for molding the plurality of male-engaging elements circumferentially on the die wheel, and a press roller, which is disposed in confronting relation with and is spaced a predetermined gap from the die wheel, synchronously in mutually opposite directions; continuously extruding molten resin from extrusion die toward the gap between the die wheel and the press roller by a predetermined width against the divided male-engaging-element-forming cavity groups; continuously introducing a sheet-like connector, which has adequate open spaces through which the molten resin is to be passed, toward the gap between the die wheel and the press roller; integrally molding, as the molten resin is pressed by the press roller, the substrate sheet and the connector on the circumferential surface of the die wheel, and at the same time, molding the male engaging elements on the circumferential surface of the die wheel as the divided male-engaging-element-forming cavity groups are filled with part of the molten resin; positively cooling the circumferential surface of the die wheel; and continuously taking up the molded and cooled surface fastener from the circumferential surface of the die wheel.

BRIEF DESCRIPTION OF THE DRAWINGS

FIG. 5 is a fragmentary horizontal cross-sectional view of the surface fastener.

DETAILED DESCRIPTION OF THE PREFERRED EMBODIMENTS

Preferred embodiments of this invention will now be described in detail with reference to the accompanying drawings.

Figure 1:
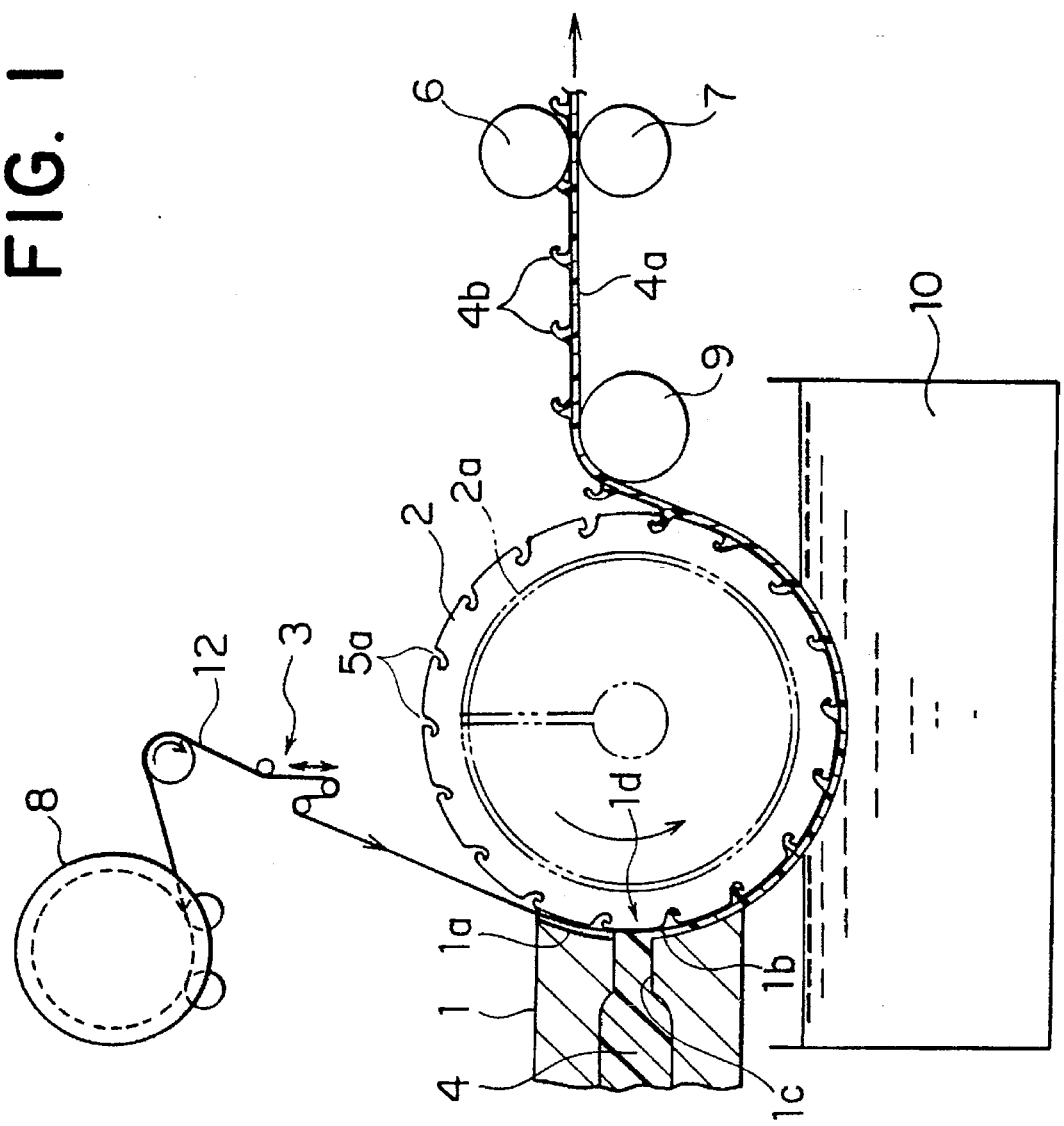
FIG. 1 is a front view, with a part shown in cross-section, schematically showing main part of a typical manufacturing apparatus of a surface fastener of the invention.
Figure 2:
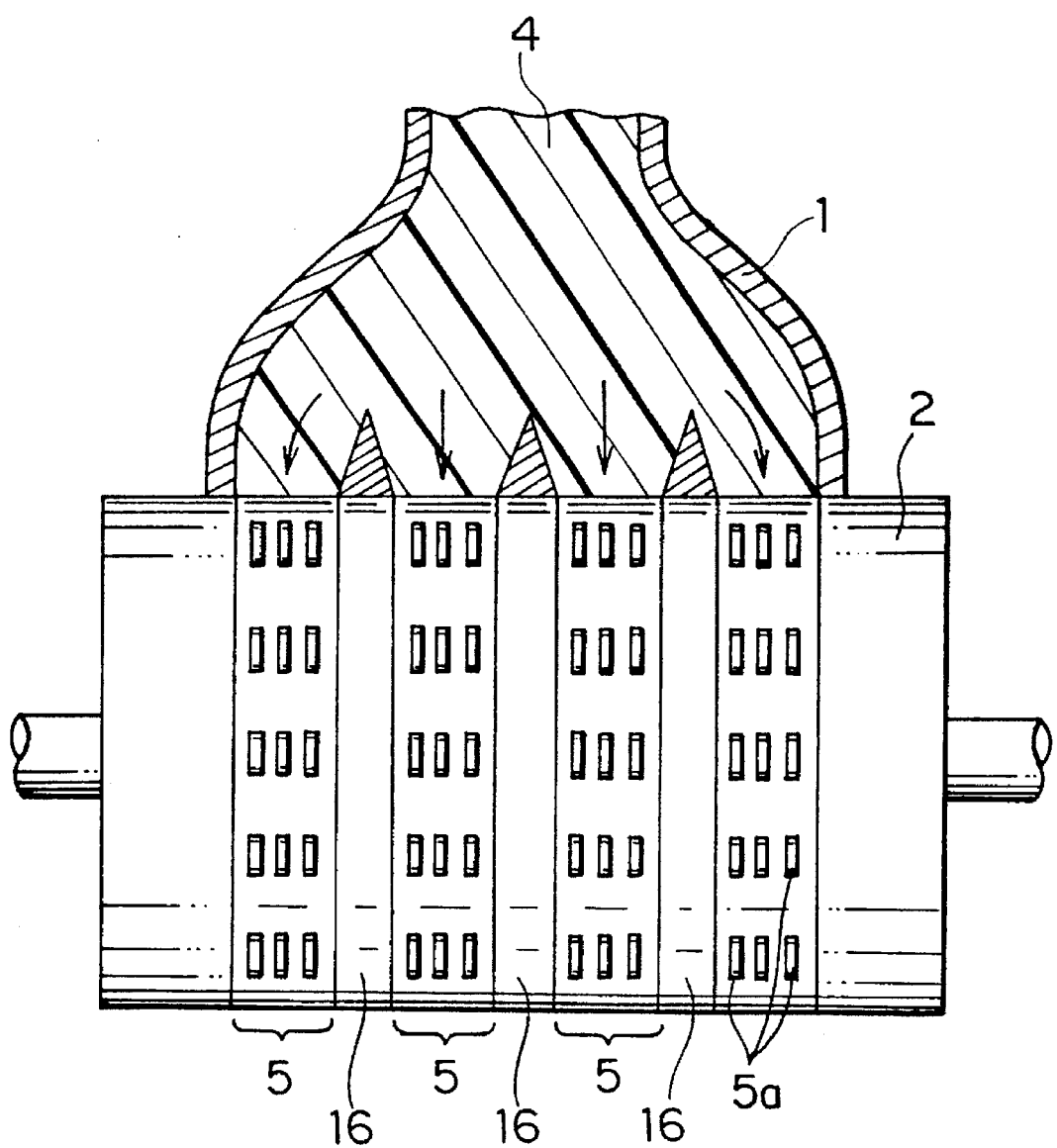
FIG. 2 is a fragmentary horizontal cross-sectional view of the apparatus of FIG. 1.

FIG. 1 is a front view, with a part shown in cross-section, schematically showing an apparatus for manufacturing molded surface fasteners, which are connected by a connector, by injection molding according to a first embodiment of this invention. FIG. 2 is a fragmentary horizontal cross-sectional view of the apparatus.

In FIGS. 1 and 2, reference numeral 1 designates an injection die; the upper half surface of a tip of the injection die 1 is an arcuate surface 1a having a curvature substantially equal to that of a die wheel 2 described below, while the lower half surface is an arcuate surface 1b having a curvature such that a predetermined gap is defined with respect to a curved circumferential surface of the die wheel 2. The injection die 1 is a T-shape die for continuously injecting molten resin 4 in the form of a sheet under a predetermined resin pressure from an injection nozzle defined centrally between the upper and lower arcuate surfaces 1a, 1b. In this embodiment, the injection die 1 has a central sprue 1c. The injection nozzle is subdivided into a plurality of nozzles 1d each having a predetermined width.

The circumferential surface of the die wheel 2 is disposed in part; adjacent to the upper arcuate surface 1a of the injection die 1 and is spaced a predetermined gap from the lower arcuate surface 1b, with its axis parallel to the injection nozzle tip surface. In the illustrated example, as shown in FIG. 1, the die wheel 2 has in its circumferential suraface a multiplicity of hook-element-forming cavity groups 5 spaced a predetermined gap from one another axially of the die wheel 2. A smooth surface 16 is defined between each pair of adjacent cavity groups 5. These cavity groups 5 are disposed facing the respective subdivided nozzles 1d, as shown in FIG. 2.

Figure 3:
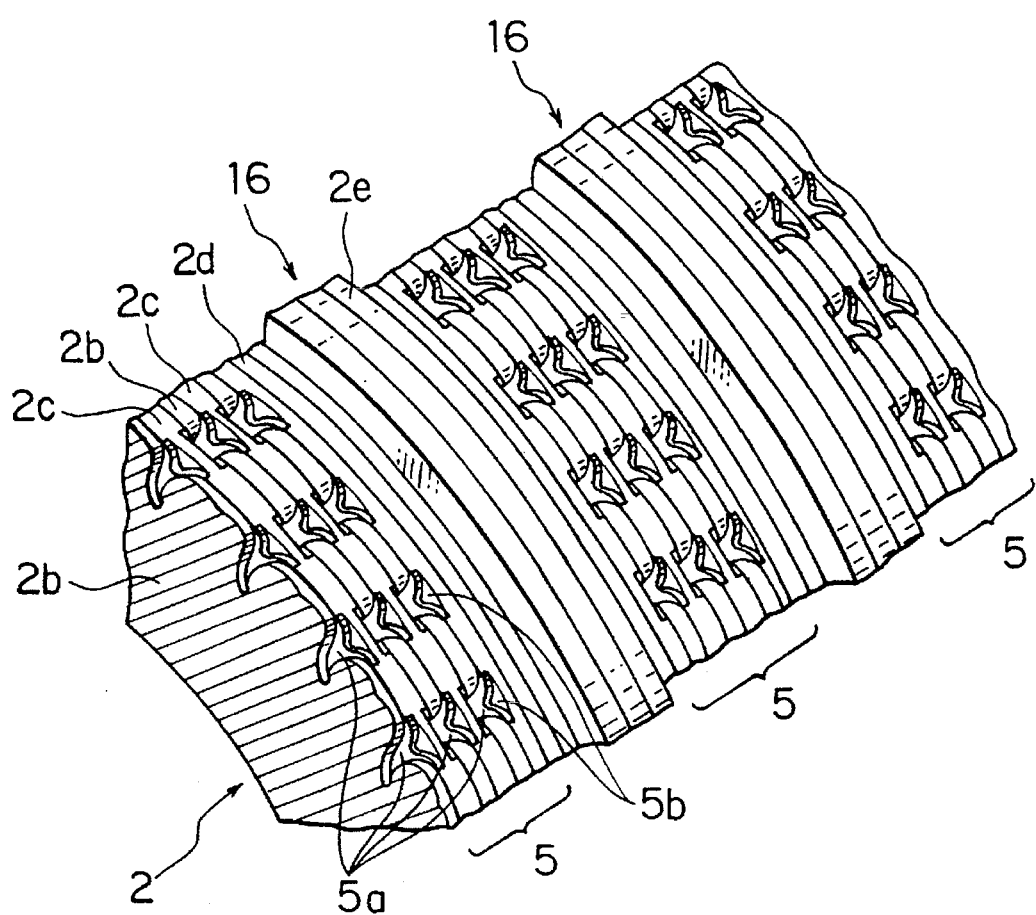
FIG. 3 is a fragmentary enlarged perspective view showing an example of a surface structure of the die wheel which consists the manufacturing apparatus.

As the structure of the die wheel 2 is substantially identical with that disclosed in U.S. Pat. No. 4,775,310, it is described only briefly here. The die wheel 2 is in the form of a hollow drum defining a cooling water jacket 2a and, as shown in FIG. 3, is composed of a number of ring-shape plates placed one over another about and along its axis. In each cavity groups 5, each of ring-shape plates 2b having the same diameter and composing every other plates has in opposite surfaces a multiplicity of hook-element-forming cavities 5a with their bases opening to the circumferential surface of the die wheel 2 while each of ring-shape plates 2c adjacent to the ring-shape plate 2b with hook-element-forming cavities 5a has in opposite surfaces a multiplicty of reinforcing-rib-forming cavities 5b. A desired number of these ring-shape plates 2b, 2c are alternately arranged. At one side of each cavity groups, there disposed a desired number of ring-shape plates 2d having the same diameter and each having a smooth circumferential surface, and also a desired number of ring-shape plates 2e having a diameter equal to the sum of the diameter of the ring-shape plates 2d and the thickness of the substrate sheet 4a to be formed and having a smooth circumferential surface. The circumferential surface composed of these ring-shape plates 2e consists the smooth surface 16.

Thus the ring-shape plates 2b, 2c, 2d, 2e form a laminate, and a number of identical laminates are arranged in order about and along the axis of the die wheel 2. The die wheel 2 is driven by a non-illustrated well-known synchronous drive unit for rotation in a direction indicated by an arrow. Accordingly the molten resin 4 injected toward the individual cavity groups 5 facing the respective subdivided nozzles 1d does not at all come to the smooth surfaces 16 of the die wheel 2.

In molding the surface fastener in the foregoing embodiment, molten resin 4 is injected as being subdivided, into the gap between the upper arcuate surface 1a of the injection die 1 and the circumferential surface of the die wheel 2 toward the individual cavity groups 5. At the same time, a sheet-like connector 12, in the form of a coarse woven or knit fabric or a metal net, drawn from a roll 8 is introduced over the substantially entire width of the hook-element-forming part of the circumferential surface of the die wheel 2 via a tension controller 3. Further, in this embodiment, a cooling water tank 10 is disposed under the die wheel 2 so that a lower part of the die wheel 2 is soaked in the cooling water tank 10. A guide roller 9 is disposed diagonally upwardly on the downstream side of the cooling water tank 10, and further downstream of the guide roller 9, a vertical pair of take-up rollers 6, 7 rotatable in synchronism at a speed slightly faster than the die wheel 2 are disposed.

Figure 4:
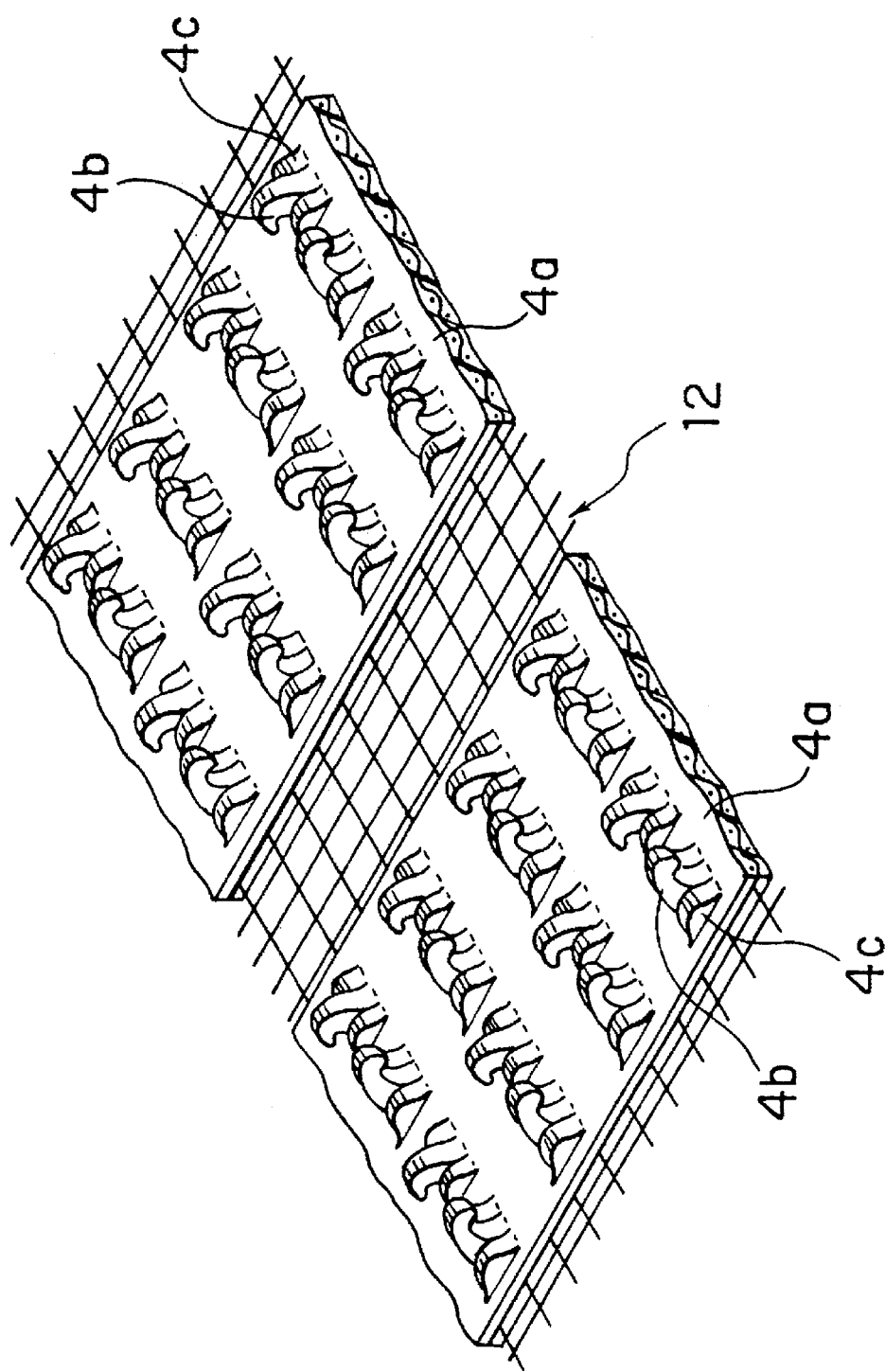
FIG. 4 is a fragmentary perspective view of a surface fastener integrally connected by a sheet-like connector, which is a typical embodiment of the invention.
Figure 6A:
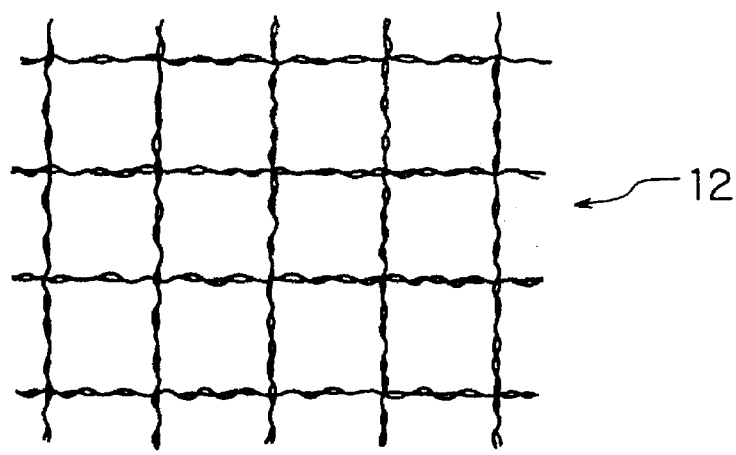
FIG. 6(A), 6(B) and 6(C) are fragmentary cross-sectional views schematically showing modifications of the sheet-like connector of the invention.
Figure 6B:
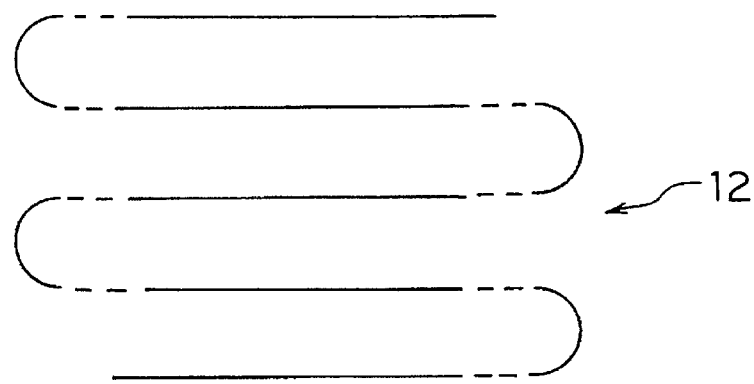
Figure 6C:
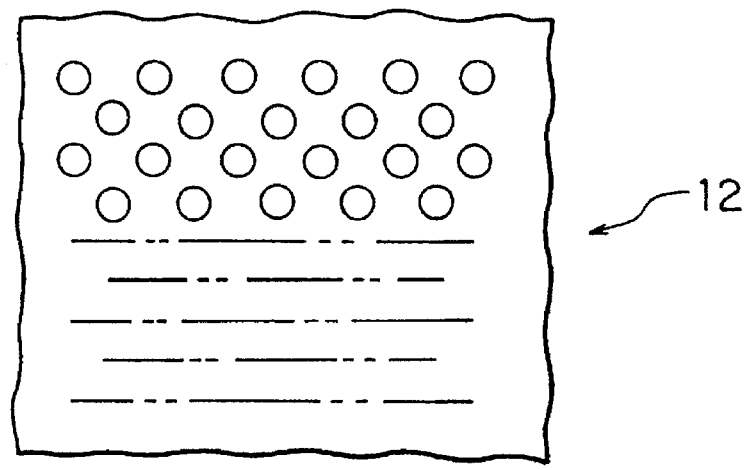

The sheet-like connector 12 may be a coarse woven or knit fabric or a metal net, as shown in FIGS. 4 and 6(A). In an alternative form, the sheet-like connector 12 may be fiber yarns or metal wires to be successively introduced at predetermined intervals circumferentially of the die wheel 2 and parallel to the axis of the die wheel 2, as shown in FIG. 6(B). In this alternative case, the fiber yarns or metal wires are introduced circumferentially of the die wheel 2 as the continuous fiber yarn or metal wire is drawn from a non-illustrated spool and is traversed in round trip parallel to the axis of the die wheel 2 using an ordinary traverse mechanism, or as the previously severed fiber yarns or metal wires are successively supplied parallel to the axis of the die wheel 2 in timed relation to the rotation of the die wheel 2. The fiber yarns or metal wires may be supplied in such a manner that a plurality of them are simultaneously supplied in a direction of die wheel rotation, having a predetermined space between one another axially of the die wheel. In that case, there provided, in the circumferential surface of the die wheel, regions with the hook-element-forming cavities 5a and regions without the hook-element-forming cavities 5a circumferentially alternately. The fiber yarns or metal wires may be supplied in both ways as described above simultaneously. Further, the sheet-like connector may be nonwoven cloth, paper or synthetic resin film having adequate open spaces through which molten resin is to be passed, as shown in FIG. 6(C).

The yarns may be natural fiber yarns, monofilaments or multifilament yarns of thermoplastic resin, such as nylon, polyester and polypropylene, or metal wires. Though the material of the fibers should preferably be the same as the thermoplastic synthetic resin of the surface fastener, a different material may be used. Since the size of fibers, fiber yarns and metal wires of the sheet-like connector 12 define the thickness of the sheet-like connector 12, it is decided depending on the thickness of the substrate sheet 4a of the surface fastener and it is preferably 10–30% of the thickness of the substrate sheet 4a. In molding surface fasteners, the molten resin temperature, the resin pressure, the die-wheel temperature and the rate of rotation of the die wheel are controlled according to the material of resin to be used. The necessary resin pressure, which depends on the size of open spaces of the sheet-like connector 12, is generally within a range of 50–150 kg/cm$^2$, preferably 80–110 kg.cm$^2$.

For molding the surface fastener of this invention on the foregoing apparatus, molten resin 4 is continuously injected from the injection die 1 under the predetermined resin pressure toward the individual hook-element-forming cavity groups 5 on the circumferential surface of the die wheel 2 in rotation. At the same time, part of the sheet-like connector 12 which is introduced simulatenously and the molten resin 4 are joined together, and a multiplicity of hook elements 4b are successively molded in timed relation to the rotation of the die wheel 2 as the individual hook-element-forming cavity groups 5 in the circumferential surface of the die wheel 2 are filled with part of molten resin 4 via the open spaces of the sheet-like connector 12. Meanwhile a number of substrate sheets 4a in which part of the sheet-like connector 12 is embedded and which are connected to one another by the sheet-like connector 12 are integrally molded in a predetermined thickness.

The molten resin 4 shaped into the form of a surface fastener on the circumferential surface of the die wheel 2 together with the sheet-like connector 12 is moved around substantially a lower half of the circumferential surface of the die wheel 2 as guided by the guide roller 9. During that time, the hook elements 4b and the substrate sheets 4a in which part of the sheet-like connector 12 is embedded are gradually solidified as the molten resin 4 is cooled partly from the inside of the die wheel 2 and partly in the cooling water tank 10. During this solidification, the substrate sheets 4a are positively drawn horizontally by the take-up rollers 6, 7. When the individual hook elements 4b are smoothly removed from the cavities 5a, 5b as being resiliently deformed, they restore their original shape immediately after having been removed from the die wheel 2 and are completely solidified. As a result, a surface fastener with the stable shape can be obtained.

In this embodiment, in order to remove a molded resin product (i.e., a connector-embedded surface fastener) from the die wheel 2, the vertical pair of take-up rollers 6, 7 rotatable in opposite direction in synchronism with each other are used. Although the circumferential surfaces of the take-up rollers 6, 7 may be smooth, it is preferable that they have grooves for passage of hook-element rows so that the hook elements 4b are kept free from damage. The speed of rotation of the take-up rollers 6, 7 is set at a value slightly higher than the speed of rotation of the die wheel 2 so that the hook elements 4b can be smoothly removed from the hook-element-forming cavity groups 5.

In the thus manufactured surface fastener, since a plurality of substrate sheets 4a are connected to one another by a coarse sheet-like connector 12 part of which is embedded in the substrate sheets 4a as shown in FIGS. 4 and 5, the substrate sheets 4a has an adequate degree of toughness and is flexible along part of the sheet-like connector 12 so that the surface fastener can be attached reliably fit to any of various contours of articles and can be kept free from any inconvenience such as tear due to the sewing needle during sewing. Further, the surface fastener can be cut between a desired adjacent pair of substrate sheets 4a along the connector 12, if neccessary.

Figure 7:
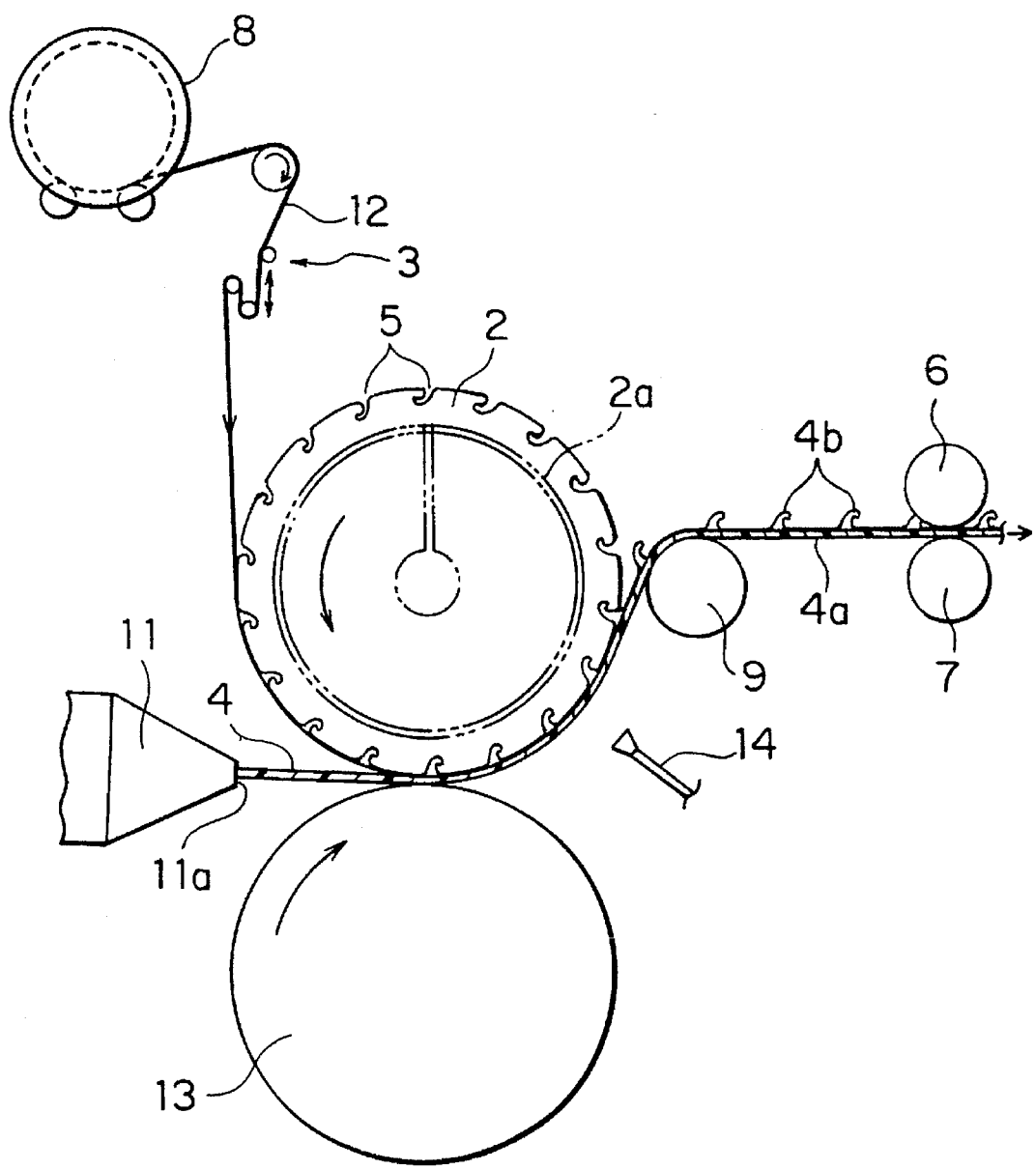
FIG. 7 is a fragmentary cross-sectional view showing another example of manufacturing apparatus of the invention.

FIG. 7 is a vertical cross-sectional view showing an apparatus for manufacturing a connector-embedded surface fastener by continuous extrusion molding according to a second embodiment of this invention.

In this embodiment, an extrusion die 11 is used instead of the injection die 1 of the foregoing embodiment, and a press roller 13 is disposed under the die wheel 2 having a structure substantially identical with the one described above with a predetermined gap therebetween. A nozzle of the extrusion die 11 is divided into the same number of nozzles 11a as that of the hook-element-forming cavity groups 5 and each of the subdivided nozzles 11a faces the respective hook-element-forming cavity groups 5 for extruding molten resin 4 toward the gap between the die wheel 2 and the press roller 13. As a most significant feature of this embodiment, in the circumferential surface of the die wheel 2, the hook-element-forming cavities 5a together with the substrate-sheet-forming portions are divided into a number of groups or sections, and the sheet-like connector 12 is introduced into the gap between the molten resin 4 extruded from the extrusion die 11 and the circumferential surface of the die wheel 2. Specifically, in this illustrated embodiment, a sheet-like connector 12 having a width substantially equal to the molding width of the die wheel 2, together with the molten resin 4 extruded from the subdivided nozzles 11a of the extrusion die 11, is introduced into the gap between the die wheel 2 and the press roller 13. Likewise in the foregoing embodiment, inside the die wheel 2, a cooling water jacket 2a for cooling the circumferential surface of the die wheel 2 from inside is mounted. A cooling air blower 14 is disposed to blow a cooling air toward the circumferential surface of the die wheel 2 after the latter has passed a position of a pressure surface with the press roller 13. The die wheel 2 and the press roller 13 are driven by a non-illustrated drive unit to rotate in opposite directions, as indicated by arrows in FIG. 4, in synchronism with each other.

A guide roller 9 is disposed diagonally upwardly on the downstream side of the cooling air blower 14, and a vertical pair of take-up rollers 6, 7 rotatable in opposite directions at a speed slightly faster than the rotation of the die wheel 2 is disposed on the downstream side of the guide roller 9.

According to the apparatus of the second embodiment, the molten resin 4 extruded from the subdivided nozzles 11a of the extrusion die 11, together with the sheet-like connector 12 introduced circumferentially of the die wheel 2, is introduced into the gap between the die wheel 2 and the press roller 13. The molten resin 4 is then forced into the individual hook-element-forming cavity groups 5 through the open spaces of the sheet-like connector 12 under the pressure by the press roller 13. A single sheet-like connector 12 to be introduced into the above-mentioned gap circumferentially of the die wheel 2 is embedded in the individual substrate-sheets 4a corresponding to the respective hook-element-forming cavity groups 5, thereby connecting the substrate-sheets 4a to one another. The resulting surface fastener is moved around substantially a quarter of the circumferential surface of the die wheel 2 and is then continuously removed from the circumferential surface of the die wheel 2 as positively taken by the take-up rollers 6, 7 via the guide roller 9.

During that time, the surface fastener is gradually cooled by the cooling means 2a inside the die wheel 2 and by the cooling air blower 14 and is thereby solidified. In this embodiment, if the sheet-like connector 12 to be introduced into the gap between the die wheel 2 and the press roller 13 is previously heated to eliminate a difference of temperature with the substrate sheet 4a in semimolten state, it would be fused with the substrate sheet 4a more reliably.

Also in the second embodiment, the individual hook element 4b has a pair of reinforcing ribs 4c on opposite side surfaces; the hook elements 4b in the same row are directed in a common direction, and the hook elements 4b in adjacent rows are directed in opposite directions. The reinforcing rib 4c may be omitted, but the reinforcing ribs 4c are effective to prevent the hook elements 4b from falling flat laterally. Alternatively, the hook elements 4b successive in a row may be directed alternately in opposite directions so that a surface fastener having no directivity in engaging strength can be obtained. This invention should by no means be limited to the illustrated example, and various modifications may be suggested without departing from the sprit of this invention.

As is apparent from the foregoing description, according to the molded surface fastener of this invention, since the substrate sheet 4a with hook elements 4b is divided into a number of sections via the sheet-like connector 12, the surface fastener has an adequate degree of flexibility along part of the sheet-like connector 12 and can be reliably and easily attached to fit to any of various contours of articles. By cutting the sheet-like connector 12 between a desired adjacent pair of subdivided substrate-sheets 4a, it is possible to obtain a desired width of surface fastener. Further, since the sheet-like connector 12 is embedded in the substrate sheet 4a over its entire area, it is possible to secure an adequate degree of toughness of the substrate sheet 4a, making the surface fastener durable for repeated use.

Further, according to this invention, a molded surface fastener can be continuously manufactured efficiently and economically in a single process with only minor modifications to the well-known injection molding or extrusion molding.

The molded surface fastener of this invention can be molded by a common injection molding machine.

What is claimed is:

1. A molded surface fastener of synthetic resin, comprising:

(a) a substrate sheet;
    (b) a multiplicity of male engaging elements integrally molded with said substrate sheet and standing in rows on one surface of said substrate sheet; and
    (c) said substrate sheet being divided into sections connected to one another via a connector, said connector being smaller in thickness than said substrate sheet and having open spaces through which molten resin is to be passed during the molding of said substrate sheet;
    (d) said connector integrally joined with said substrate sheet simultaneously with the molding of said substrate sheet and said male engaging elements.

2. A molded surface fastener according to claim 1, wherein said substrate sheet is divided into two or more sections spaced a predetermined gap from one another transversely of said surface fastener via said connector.

3. A molded surface fastener according to claim 2, wherein said connector is spread transversely of said surface fastener and is composed of a plurality of fiber yarns or metal wires parallel spaced at predetermined distances longitudinally of said surface fastener.

4. A molded surface fastener according to claim 2, wherein said connector is a coarse woven fabric, knit fabric or metal net having adequate open spaces over its entire area through which molten resin is to be passed during the molding of said substrate sheet.

5. A molded surface fastener according to claim 2, wherein said connector is non-woven cloth, paper or synthetic resin film having adequate open spaces over its entire area through which molten resin is to be passed during the molding of said substrate sheet.

* * * * *